United States Patent [19]

Matthews et al.

[11] Patent Number: 5,168,083

[45] Date of Patent: Dec. 1, 1992

[54] HIGH OPACITY DEFINED KAOLIN PRODUCT AND METHOD OF PRODUCING SAME

[75] Inventors: Kirt L. Matthews; Bernard A. Miller, both of Macon, Ga.

[73] Assignee: Georgia Kaolin Company, Inc., Elizabeth, N.J.

[21] Appl. No.: 521,204

[22] Filed: May 9, 1990

[51] Int. Cl.$^5$ ............................................. C04B 33/04
[52] U.S. Cl. ................................. 501/146; 501/148; 501/149; 106/416; 106/486
[58] Field of Search ............... 106/486, 416; 501/144, 501/145, 146, 147, 148, 149

[56] References Cited

U.S. PATENT DOCUMENTS

| | | | |
|---|---|---|---|
| 2,992,936 | 7/1961 | Rowland | 106/486 |
| 3,058,671 | 10/1962 | Billue | 501/145 |
| 3,343,973 | 9/1967 | Billue | 501/145 |
| 4,018,673 | 4/1977 | Hughes | 106/486 |
| 4,075,030 | 2/1978 | Bundy et al. | 106/416 |
| 4,241,142 | 12/1980 | Kaliski et al. | 501/145 |
| 4,650,521 | 3/1987 | Koppelman | 106/486 |
| 4,888,315 | 12/1989 | Bowman et al. | 501/144 |
| 4,916,094 | 4/1990 | Salinas | 501/148 |
| 4,943,324 | 7/1990 | Bundy et al. | 501/145 |

Primary Examiner—William R. Dixon, Jr.
Assistant Examiner—Paul Marcantoni
Attorney, Agent, or Firm—Klauber & Jackson

[57] ABSTRACT

A high opacity, defined kaolin clay product having a relatively narrow particle size distribution, low colloidal particle content and an average particle surface area of less than about 30 square meters per gram is prepared by defining an aqueous kaolin clay slurry via controlled centrifugation to remove a substantial portion of the colloidal particles therein. Prior to being subjected to centrifugation, the aqueous kaolin clay slurry is prepared so as to improve the defining process achieved via centrifugation by first subjecting the aqueous kaolin clay suspension to scrub grinding so as to break up agglomerates into individual kaolin clay particles without substantial delamination of the kaolin clay particles. Thence, the mechanically dispersed kaolin clay suspension is dispersed to its optimum level by the addition of a chemical dispersant, most advantageously sodium hexamethaphosphate, and dilution water is admixed into the aqueous kaolin clay suspension to reduce the solids content thereof to a level less than at least about 18% solids by weight, and preferably to about 5% to about 15% by weight, prior to centrifugration.

11 Claims, 2 Drawing Sheets

HIGH OPACITY DEFINED KAOLIN PRODUCT AND METHOD OF PRODUCING SAME

BACKGROUND OF THE INVENTION

The present invention relates to a defined kaolin composition exhibiting high opacity and to a method of producing the kaolin composition by controllably defining a kaolin clay. More specifically, the present invention relates to a beneficiated kaolin product having improved opacifying efficiency thereby rendering the product functional as a high performance paper coating or filler, and to a method of producing the beneficiated kaolin product by controllably defining and otherwise treating a base kaolin clay so as to remove a substantial portion of colloidal particles therein.

It is well known in the paper industry, that a wide variety of pigments, such as titanium dioxide, calcium carbonate, talc, synthetic silicates, and clays such as bentonite and kaolin, are suitable for use as paper fillers and/or coatings. Kaolin, a naturally occurring hydrated aluminum silicate, is presently the most widely utilized and is available in a range of particle sizes and brightnesses, as well as being either delaminated or nondelaminated. Hydrated kaolin is white in color, has a fine particle size, is relatively chemically inert, and makes an ideal low cost paper filler. Although calcined (anhydrous) kaolin is also available for use as a paper filler and can impart greater opacity to paper than the hydrated kaolin, it has the serious disadvantage of being more abrasive.

Prior art kaolin paper fillers and coatings are typically produced by a beneficiation process which typically consists of fractionating in a continuous centrifuge to remove oversize material followed by leaching to remove iron-based colored compounds. In the leaching process the kaolin is acidified with $H_2SO_4$ to a pH of 3.0 to solubilize the iron. Sodium hydrosulfite is then added to reduce the iron to a more soluble ferrous form which is removed during the dewatering process. The flocculated clay, generally at approximately 30% solids by weight, is then filtered, such as by dewatering on a rotary vacuum filter to a solids level approximately 60% by weight. The filter cake is then either dried or redispersed with additional dry clay if it is to be sold as approximately 70% by weight solids slurry. To produce high brightness products, i.e., a product having a brightness index greater than 90, impurities may be removed from the kaolin clay by further processing the kaolin clay through flotation or magnetic separation. To produce a delaminated product, the coarse fraction from the initial centrifugation is ground in sand grinders to shear the stacks of platelets normally found in kaolin and thereby produce individual particles having an equivalent spherical diameter less than 2 microns.

It is well appreciated in the art that kaolin clay pigments must have certain rheological and optical properties to be suitable for use in paper manufacture as paper coatings or paper fillers. The kaolin clay pigment must be available as a high solids suspension typically having a clay solids content of about 50% to about 70% by weight, but still exhibiting a viscosity low enough to permit efficient and economical pumping, mixability with other filler or coating components, and application to the paper. Additionally, it is of utmost importance that the kaolin pigment exhibit certain optical properties, namely high brightness, high gloss and high opacity.

The influence of particle size distribution upon the optical properties of kaolin pigments has long been appreciated in the art. For example, in commonly assigned U.S. Pat. No. 2,992,936, Rowland discloses that a kaolin clay product having the following particle size distribution (in terms of equivalent spherical diameter, e.s.d.) will consistently show improved brightness, gloss and opacity when used as a paper coating clay:

99–100% by wt. less than 5 microns e.s.d.
98–100% by wt. less than 4 microns e.s.d.
88–100% by wt. less than 1.7 microns e.s.d.
85–97% by wt. less than 1.5 microns e.s.d.
70–84% by wt. less than 1.0 micron e.s.d.
25–37% by wt. less than 0.5 micron e.s.d.
10–15% by wt. less than 0.3 micron e.s.d.

Rowland further discloses producing such a controlled particle size kaolin product by first degritting a kaolin clay slurry, thence passing the degritted kaolin clay slurry at 21% solids by weight through a Sharples centrifuge at 400 cc per minute at 6300 r.p.m. and then recentrifuging the overflow effluent at the same rate and r.p.m. The final overflow effluent represented a cut taken off the fine end of the degritted clay slurry and amounted to 22% by weight of the degritted clay slurry. The degritted clay slurry remaining after removal of this 22% fine cut, i.e., the combined underflows from the two centrifugation steps, was reslurried to about 20% solids with 0.15% sodium hexametaphosphate and allowed to settle by gravity through a 1 inch slip depth. The sedimented coarse clay, which amounted to about 48% of the degritted clay slurry, was discarded leaving about 30% by weight of the original degritted kaolin clay slurry as an intermediate product to be subjected to further treatment via bleaching, filtering and drying to yield a commercial coating clay product.

In a paper entitled "Chemically Induced Kaolin Floc Structures for Improved Paper Coating", presented at the 1983 TAPPI Coating Conference, W. H. Bundy et al. disclosed an improved high bulking paper coating pigment, referred to as 1089, which comprises a chemically modified kaolin produced by the Georgia Kaolin Company, Inc. and marketed under the trade name Astra-Lite. Structures of optimum functionality are said to be derived by chemically treating a base kaolin clay having a particle size distribution wherein from about 80% to 93% by weight of the kaolin particles are less than 2 microns e.s.d. to selectively flocculate a portion of the submicron fines therein thereby aggregating a portion of these fines on the surface of larger kaolin platelets and effectively inactivating a large portion of colloidal particles. Such a chemically modified kaolin coating pigment derived from a base kaolin wherein 92% by weight particles under 2 microns is presented by Bundy et al. as having a particle size distribution as follows:

99% by wt. less than 5 microns e.s.d.
97% by wt. less than 3 microns e.s.d.
90.5% by wt. less than 2 microns e.s.d.
65.5% by wt. less than 1 micron e.s.d
31.5% by wt. less than 0.5 micron e.s.d.
12.5% by wt. less than 0.3 micron e.s.d.
5.5% by wt. less than 0.17 micron e.s.d.

Such a chemically flocculated kaolin coating pigment may be produced, for example, as disclosed in U.S. Pat. Nos. 4,075,030; 4,076,548 or 4,078,941, by selectively flocculating a base kaolin clay with the addition of either a low molecular weight (less than 1,000,000) organic flocculent such as a polyfunctional amine, e.g., ethylene diamine or hexamethylene diamine, or long carbon chain amine, with or without citric acid and, optionally, in the presence of fine mica below 150 mesh in size.

There is disclosed in U.S. Pat. No. 4,738,726, an opacifying pigment composition suitable for use as a paper filler or coating which consists essentially of particles of hydrous kaolin clay flocculated with a controlled minor amount of a cationic polyelectrolytic flocculent, e.g., a quaternary ammonium polymer salt or a diallyl ammonium polymer salt. The base kaolin clay is selected to have a particle size distribution prior to flocculation wherein less than 35% by weight are finer the 0.3 microns, i.e., colloidal.

SUMMARY OF THE INVENTION

The process of the present invention provides a method of preparing a high opacity, defined kaolin clay product having a relatively narrow particle size distribution, low colloidal particle content and an average particle surface area of less than about 30 square meters per gram. In accordance with the process of the present invention, an aqueous kaolin clay slurry is defined via controlled centrifugation to remove a substantial portion of the colloidal particles therein thereby narrowing the particle size distribution of the kaolin particles in the suspension whereby the opacifying properties of the kaolin clay suspension are improved.

Prior to being subjected to centrifugation, the aqueous kaolin clay slurry is prepared so as to improve the defining process achieved via centrifugation by first dispersing the aqueous kaolin clay suspension and then subjecting the dispersed suspension to scrub grinding so as to break up agglomerates into individual kaolin clay particles without delaminating the kaolin clay particles. Thence, the mechanically dispersed kaolin clay suspension is dispersed to its optimum level by the addition of a chemical dispersant, most advantageously sodium hexametaphosphate. After dispersing the aqueous kaolin clay suspension, dilution water is admixed into the aqueous kaolin clay suspension to reduce the solids content thereof to a level less than at least about 18% solids by weight, and preferably to about 5% to about 15% by weight, prior to centrifugation. Additionally, the subsequent defining process may be further improved by preheating the low solids aqueous kaolin clay suspension to a temperature of at least 100° F. and preferably between 100° F. and 125° F.

DESCRIPTION OF A PREFERRED EMBODIMENT

Figure 1:
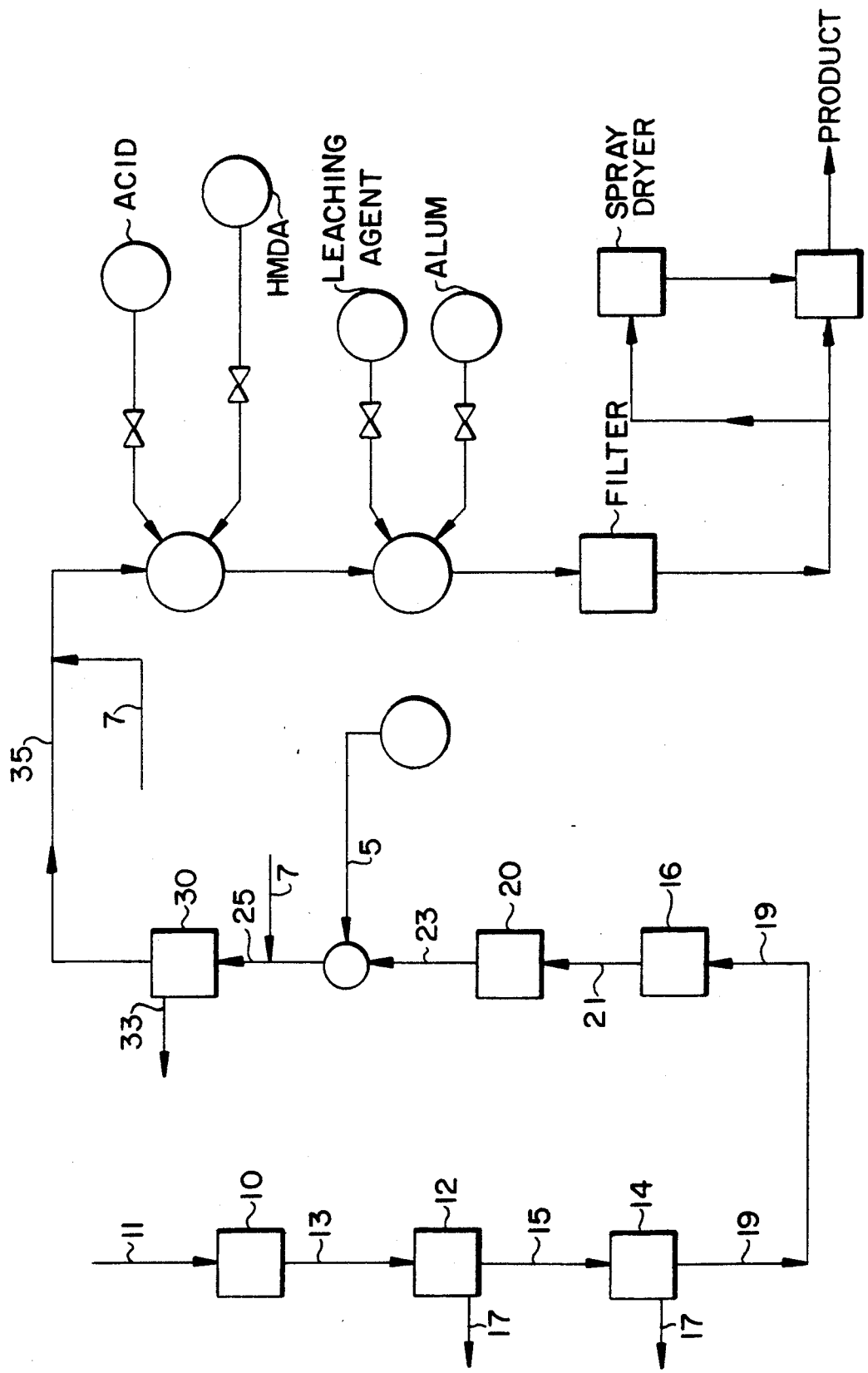
FIG. 1 is a process flow diagram illustrating a preferred embodiment of the process of the present invention.

Referring now to FIG. 1, there is depicted schematically therein a flow diagram illustrating a preferred embodiment of the process of the present invention wherein a kaolin clay is defined via subjecting a low solids, optimally dispersed aqueous kaolin dispersion to centrifugation controlled so as to produce an underflow slurry of kaolin particles having an average particle surface area of less than about 30 square meters per gram.

All surface areas herein referred to are determined by a slightly modified version of the standard methylene blue spot test procedure outlined by M. J. Nevins and D. J. Weintritt in an article entitled "Determination of Cation Exchange Capacity by Methylene Blue Adsorption", published in the American Ceramics Society Bulletin, Volume 46, pages 587-592, 1967. In accordance with this procedure, a one gram sample of powdered kaolin clay prepared by spray drying and pulverizing the underflow kaolin slurry produced after defining via controlled centrifugation was weighed into a 100 ml. beaker. Ten milliliters of deionized water was then added and the aqueous clay suspension in the beaker continuously agitated with a magnetic stirrer and stirring bar while methylene blue stock solution was added in 0.5 milliliter increments. Approximately one minute after each addition of methylene blue, a drop of liquid was removed from the beaker with a glass rod and deposited on a piece of Whatman #50 filter paper. The addition of methylene blue ceased when the dye first appeared as a blue ring surrounding the dyed solids formed on the filter paper, the blue ring indicating unabsorbed dye. The suspension was then mixed for an additional two minutes after the initial appearance of the blue ring to assure maximum adsorption of the dye by the clay solids in the suspension. An additional drop was then removed from the beaker and placed on the filter paper. If the blue ring again appeared, the test was considered completed. If not, the addition on methylene blue stock was continued in 0.5 milliliter increments until a stable blue ring was obtained.

After achievement of a stable blue ring, the average surface area of the kaolin particles was determined using the following formula:

$$\text{Surface Area} = \frac{(7.826)(V_{MB})\ (\text{meq/ml})_{MB} \times 100}{(g_{DC})}$$

where:
  $V_{MB}$ = milliliters of methylene blue solution added
  $(\text{meq/ml})_{MB}$ = milliequivalents of methylene blue per milliliter of solution
  $(g_{DC})$ = dry weight of the clay sample in grams In the preferred embodiment of the present invention as illustrated in FIG. 1, the crude kaolin clay 11 to be processed is blunged with water and dispersant in a conventional manner in a commercially available blunging apparatus 10 to produce an aqueous slurry of crude kaolin clay 13 typically having a solids content ranging from about 20% to 70% by weight solids. This aqueous crude kaolin clay slurry 13 is next degritted, as in conventional practice, to remove substantially all particles in excess of 44 microns (i.e., +325 mesh) equivalent spherical diameter (e.s.d.). Advantageously, the degritting of the crude kaolin slurry is carried out by first passing the crude kaolin slurry 13 through a screening device 12, such as a sand box, to remove the coarsest material in the slurry and thence fractionating the screened kaolin clay slurry 15 on a Bird centrifuge 14 to separate a coarse fraction 17 comprising particles greater than about 5 microns e.s.d. therefrom, which coarse fraction is discarded. The discarded coarse fraction 17 typically constitutes about 50% of the original crude clay. The recovered fraction 19 of the degritted clay slurry is thence passed through a conventional magnetic separator 16 to remove a substantial portion of the iron impurities therein and produce a relatively low-iron content, degritted clay slurry 21 for further processing.

In accordance with the present invention, the aqueous kaolin clay slurry 21 is further processed to produce the defined clay product of the present invention by first scrub grinding the kaolin clay slurry to mechanically disperse the kaolin clay to provide an aqueous suspension of unaggregated kaolin clay particles. Thence a chemical dispersing agent is admixed with this aqueous kaolin clay suspension to ensure optimal dispersion of the kaolin particles in the suspension and thereafter dilution water is added to the optimally dispersed aqueous kaolin clay suspension to reduce the solids content of the suspension to an amount less than about 18% solids by weight. This low solids content optimally dispersed aqueous kaolin clay suspension is subjected to centrifugation so as to fractionate the kaolin clay suspension into an overflow slurry containing a substantial amount of the colloidal particle size material in the optimally dispersed suspension fed to the centrifuge and an underflow slurry containing a substantially reduced content of colloidal particle size material relative to the optimally dispersed suspension fed to the centrifuge and having an average particle size surface area of less than about 30 square meters per gram as measured by the methylene blue spot test procedure.

The mechanical dispersing of the aqueous kaolin clay suspension 21 is advantageously carried out by scrub grinding, that is, by passing the aqueous kaolin clay suspension 21 through a wet media grinder 20 wherein the aqueous kaolin clay suspension 21 is agitated in the presence of a grinding media, typically plus 325 mesh (i.e., greater than about 44 micron diameter) sand. The aqueous kaolin clay particles are subjected in the wet media grinder 20 to a scrubbing action which is sufficient to break up agglomerates of clay particles into individual particles, but is insufficient to separate the clay platelets making up the individual particles. That is, the scrub grinding does not exert enough energy upon the individual particles to delaminate the kaolin particles.

After screening in a conventional manner through screening apparatus 22 to remove any grinding media, a chemical dispersant 5 is admixed into this mechanically dispersed aqueous suspension 23 of deagglomerated, undelaminated kaolin clay particles to further disperse the aqueous kaolin clay suspension 23 to its optimum level of dispersion. Optimum dispersion is achieved when the Brookfield viscosity of the aqueous kaolin clay suspension reaches its minimum value. To ensure proper dispersion, the chemical dispersant is admixed into the aqueous kaolin clay suspension in an amount that results in the Brookfield viscosity of the aqueous kaolin clay suspension reaching its minimum viscosity.

The chemical dispersant 5 admixed into the aqueous kaolin clay suspension 23 most advantageously comprises sodium hexametaphosphate, although other known dispersants may also be employed. Sodium hexametaphosphate is preferred since it has proven to be more effective in dispersing the fine particle size material in the aqueous kaolin clay suspension 23. It is desired to optimally disperse the fine particle size material so as to improve the subsequent defining of the clay suspension. Typically, the amount of sodium hexametaphosphate to be added to ensure proper dispersion ranges from 0.5 to 5.0 pounds of sodium hexametaphosphate per ton of dry clay.

After addition of the chemical dispersant 5, the optimally dispersed aqueous kaolin clay suspension 23 is diluted by the addition of dilution water 7 prior to subjecting the suspension to centrifugation to reduce the solids content of the aqueous kaolin clay suspension to a solids content less than about 18% by weight and preferably in the range of about 5% to 15% by weight. It has been found that centrifugation at such a low solids content substantially improves defining as compared to centrifugation at the higher solids levels in excess of 20% by weight typically employed in conventional fractionation via centrifugation.

After addition of the water 7, the low solids aqueous kaolin clay slurry 25 may be passed directly to centrifuge means 30, but preferably is first passed through heat exchanger 28 wherein the aqueous kaolin clay suspension 25 is passed in indirect heat exchange relationship with a heating medium, for example hot water, to preheat the kaolin clay suspension 25 prior to centrifugation to a temperature of at least about 100° F. (37.8° C.). It has been found that preheating the kaolin clay suspension results in a cleaner separation during centrifugation thereby producing a more defined product. The colder the suspension fed to the centrifuge means 30, the more fines present in the underflow product suspension from the centrifuge means 30 at any given defining level. The temperature to which the feed suspension to the centrifuge means 30 may be preheated is limited by resultant boiling of the underflow from the centrifuge means 30. That is, the temperature of the feed suspension must be kept low enough to ensure that the underflow suspension does not boil. Preferably, the aqueous kaolin clay suspension 25 is preheated to a temperature ranging from about 100° F. to about 125° F. (37.8° C. to 51.7° C.) prior to centrifugation.

In the centrifuge means 30 the aqueous kaolin clay feed suspension 25 is subjected to centrifugation so as to fractionate the feed suspension 25 into an overflow suspension 33 and an underflow suspension 35. The overflow suspension comprises the finer cut and contains a substantial portion of the colloidal material originally contained in the feed suspension 25. Conversely, the underflow suspension 35 comprises the coarser cut and contains a colloidal particle size content substantially lower than the colloidal solids content in the feed suspension 25. In this manner, the aqueous kaolin clay feed suspension 25 is defined to yield as the underflow an aqueous kaolin clay suspension 35 which because of the removal of a substantial amount of the finer material therein, in particular the colloidal solids, has a much narrower particle size distribution, and consequently exhibits better opacifying ability, than the aqueous kaolin clay feed suspension 25.

As used herein, the term "defining" refers to the operation of separating and recovering a portion of the kaolin clay having a reduced content of finer particle size kaolin material, in particular colloidal particle size material, that is kaolin particles having a particle size less than about 0.3 micron equivalent spherical diameter. Defining level or percentage as used herein refers to the amount of dry clay, on a weight percent basis, removed from the kaolin clay feed suspension in the overflow suspension. For example, a defining level of 35% means that 35% by weight of the dry clay in the aqueous kaolin clay suspension 35 has been removed with the overflow.

In practice, the centrifugation of the low solids aqueous kaolin clay suspension 25 is controlled so as to produce as an underflow product suspension 35 of kaolin clay particles having a relatively narrow particle size distribution and exhibiting an average particle surface area of less than about 30 square meters per gram as measured by the methylene blue spot test procedure hereinbefore outlined. By controlling the solids level in the overflow suspension 33 by recycle to less than about 10% solids by weight, it has been possible to consistently produce a defined product having the desired opacifying properties at defining levels ranging from about 15% to about 50% by weight for Createous kaolin clays. Such a defined product will advantageously have a particle size distribution as follows:

99–100% by wt. less than 5 microns e.s.d.
87–93% by wt. less than 2 microns e.s.d.
65–75% by wt. less than 1 microns e.s.d.
20–35% by wt. less than 0.5 microns e.s.d.
5–15% by wt. less than 0.3 microns e.s.d.

The underflow aqueous kaolin clay suspension 35 from the centrifugation step is collected as the desired product and further processed according to its intended use. For example, if the product is to be used as a paper coating clay, the underflow aqueous kaolin clay suspension 35 from the centrifugation step, which is typically at a solids content of about 40% to about 50% by weight, is first diluted with water to a solids content of about 15% to about 25% solids by weight, treated with sulfuric acid to reduce its pH to a level between 2.5 and 3.0, and leached in a conventional manner by adding thereto an aqueous solution of a reducing agent, for example sodium dithionite solution at a treatment level of 2 to 6 pounds of sodium dithionite per ton of dry clay. After leaching to improve brightness, the pH of the leached aqueous kaolin clay suspension is adjusted to 3.0, filtered on a rotary vacuum filter, rinsed and reblunged. A portion of this suspension is then spray dried and the spray dried product pulverized and remixed with the remainder of the suspension to produce the desired coating clay product at a solids level about 65% solids by weight.

If, however, the underflow aqueous kaolin clay suspension 35 from the centrifugation step is to be used for paper filling applications, the underflow aqueous kaolin clay suspension 35 is again first diluted with water to a solids content of about 15% to about 25% solids by weight, but thence prior to leaching is treated with an amine, typically hexamethylenediamine at a treatment level of about 0.5 to about 2.5 pounds hexamethylenediamine per ton of dry clay, before adjusting the pH of the treated suspension to a level between 2.5 and 3.0, thence preferably adding aluminum sulfate (alum) to the amine treated suspension, typically at a rate of about 10 to about 20 pounds of alum per ton of dry clay, after leaching and further processing the aqueous clay suspension as hereinbefore described with respect to the production of a coating clay product.

Figure 2:
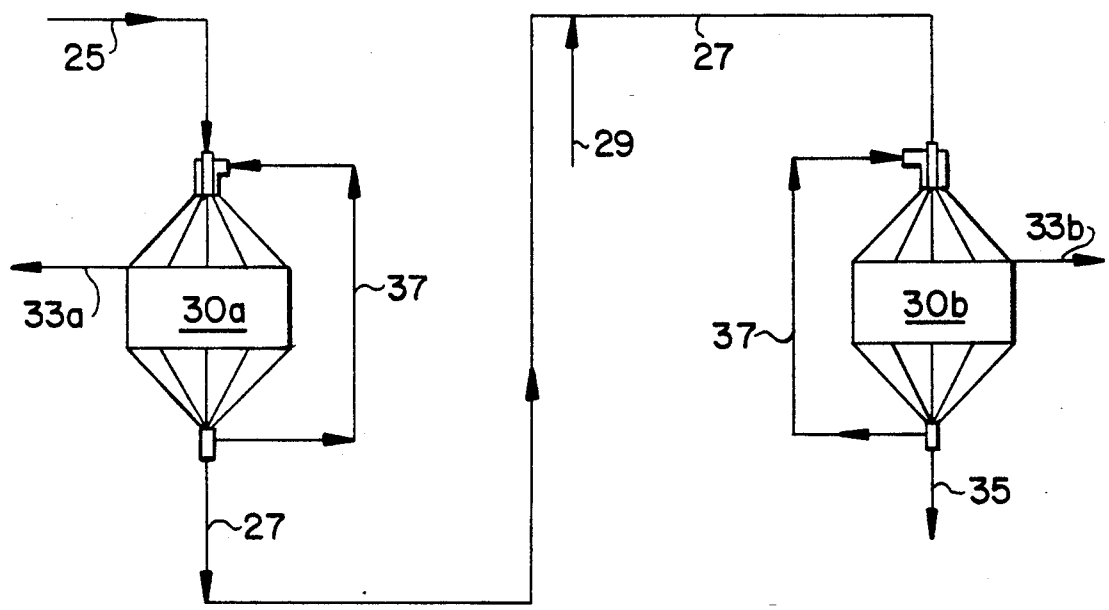
FIG. 2 is a schematic diagram illustrating a method of defining an aqueous kaolin clay suspension in accordance with the present invention using a pair of centrifuges and equipped with underflow recycle.

Referring now to FIG. 2, there is depicted schematically therein one embodiment of carrying out centrifugation in accordance with the present invention by passing the prepared aqueous kaolin clay feed suspension 25 through a pair of centrifuge means 30a and 30b. Advantageously, centrifuge means 30a and 30b each comprise disc-nozzle type centrifuges equipped for internal recycle. Such internal recycle disc-nozzle type centrifuges are commercially available from Dorr-Oliver Incorporated of Stamford, Conn., and Alfa-Laval Inc. of Fort Lee, N.J.

As depicted in FIG. 2, the low solids content aqueous kaolin clay feed suspension 25 is fed into the first centrifuge means 30a and fractionated therein into an overflow suspension 33a comprising a low solids slurry of finer kaolin particles and containing a substantial portion of the colloidal material originally contained in the feed suspension 25 and an underflow suspension 27 comprising a higher solids slurry containing a substantially lower content of colloidal solids than the feed suspension 25.

The underflow slurry 27 is collected and its solids content reduced by the addition of dilution water 29 back to a level less than about 18% solids by weight and preferably in the range of 5% to 15% solids by weight prior to passing the diluted underflow slurry 27 into the second centrifuge means 30b. In the second centrifuge means 30b, the diluted underflow slurry 27 from the first centrifuge means 30a is subjected to further fractionation into an overflow suspension 33b and a product underflow suspension 35. The overflow suspension 33b comprises a low solids slurry of finer kaolin particles and contains a substantial portion of the colloidal material remaining in the underflow slurry 27 produced in the fractionation in the first centrifuge means 30a. The underflow suspension 35 comprises a higher solids slurry containing a further reduced content of colloidal material. The underflow slurry 35 from the second centrifuge means 30b has a colloidal content which is somewhat lower than the colloidal content of the underflow slurry 27 from the first centrifuge means 30a and much less than the colloidal content in the original low solids aqueous kaolin clay feed suspension 25 fed to the centrifuge means 30a. The underflow kaolin suspension 35 from the second centrifuge means 30b is collected as a desired product and further processed as hereinbefore indicated depending upon its intended use. In controlling the fractionation processes carried out in the centrifuge means 30a and 30b, the solids level in the overflow suspensions 33a and 33b are controlled to less than about 10% solids by weight.

Figure 3:
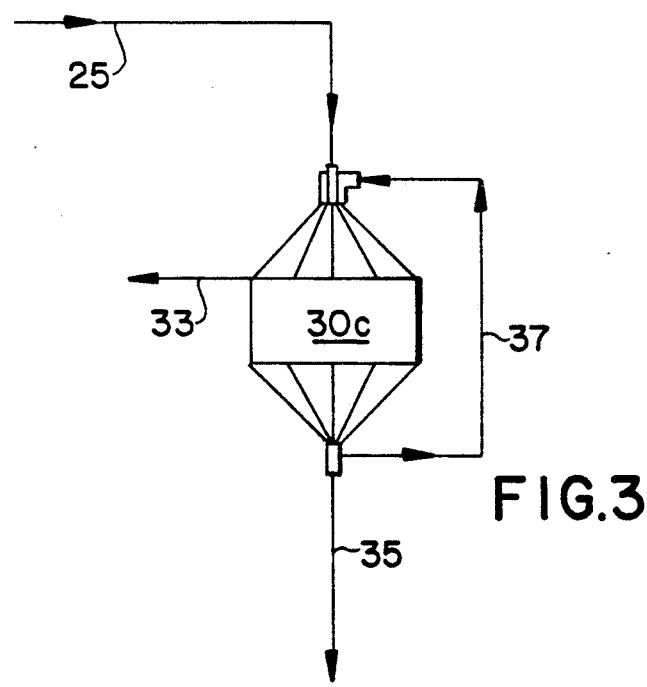
FIG. 3 is a schematic diagram illustrating a method of defining an aqueous kaolin clay suspension in accordance with the present invention using a single centrifuge equipped with underflow recycle.

Referring now to FIG. 3, there is depicted schematically therein another embodiment of carrying out centrifugation in accordance with the present invention by passing the prepared aqueous kaolin slurry feed suspension 25 through a single centrifuge means 30c which advantageously comprises an internal recycle disc-nozzle type centrifuge. Such internal recycle disc-nozzle type centrifuges are commercially available from Dorr-Oliver Incorporated of Stamford, Conn., and Alfa-Laval Inc. of Fort Lee, N.J.

As depicted in FIG. 3, the low solids content aqueous kaolin clay feed suspension 25 is fed into the internal recycle centrifuge means 30c and fractionated therein into an overflow suspension 33 comprising a low solids slurry of finer kaolin particles and containing a substantial portion of the colloidal material originally contained in the feed suspension 25 and an underflow suspension 35 comprising the coarser cut and containing a reduced level of colloidal particle size material, which reduced level is substantially lower than the colloidal solids content in the feed suspension 25. The underflow aqueous kaolin clay suspension 35 from the internal recycle disc-nozzle centrifuge means 30c is collected as a desired product and further processed according to its intended use as hereinbefore outlined.

In such an internal recycle disc-nozzle centrifuges, a selectively controlled portion of the underflow suspension discharged from the centrifuge means is internally recycled back through the centrifuge means. By internally recycled, it is meant that the recycled portion of the underflow suspension is not admixed with the feed suspension being supplied to the centrifuge for initial fractionation, but rather is separately fed back to the centrifuge and directed internally through the centrifuge means separately from the feed suspension so that it does not undergo fractionation with the feed suspension, but rather is admixed with the underflow slurry produced upon fractionation of the feed suspension immediately upstream of the nozzle passages through which the newly formed underflow suspension and the recycled underflow slurry admixed therewith exit from the separation chamber within the centrifuge means. Internal recycle is to be distinguished from external recirculation wherein the recycled portion of the underflow suspension is admixed with the feed suspension upstream of the centrifuge means so as to admix therewith and undergo further fractionation therewith when passing through the centrifuge means.

Again, by controlling the solids content in the overflow slurry to a level less than about 10% solids by weight, it has been found that the centrifugation of a low solids aqueous kaolin suspension prepared for centrifugation in accordance with the present invention may be consistently controlled to produce a defined product having a relatively narrow particle size distribution. In controlling the centrifugation process as carried out in the present invention, the average particle surface area is monitored by measuring at periodic intervals by the methylene blue spot test as hereinbefore described to ensure that the product underflow suspension has an average particle size that is less than about 30 meters squared per gram as determined by the methylene blue spot test. If the measured average particle size surface area exceeds 30 meters squared per gram, it is an indication that the colloidal solids content in the underflow slurry is increasing beyond desired levels and it is necessary to increase the amount of underflow slurry internally recycled through the centrifuge means which in turn increases the overflow suspension which in turn increases the amount of fines removed and consequently decreases the amount of fines in the underflow suspension discharged from the centrifuge means. As the amount of fines in the underflow suspension decreases, the average particle size in meters squared per gram will also decrease thereby returning the underflow suspension into the desired range. It has been found that when the surface area exceeds 30 meters squared per gram, the opacity of a filled sheet containing that product is not improved over the opacity of sheets formed with commercial fillers.

The effectiveness of method of the present invention in producing a kaolin product of improved opacity will now be illustrated through the following examples.

In the examples to be presented, all opacity measurements were obtained on handsheets incorporating the respective defined products of Examples I through IV as fillers at a handsheet filler content of 10%. The opacity measurements were obtained using TAPPI standard test methods. The opacity measurements associated with each of the defined products of the following examples was compared with the measured opacity for a handsheet incorporating Astra-Fil® 90, a commercially available high performance delaminated filler kaolin clay manufactured by Georgia Kaolin Company, Inc. of Union, N.J., to determine the opacity improvement, that is the increase in points over the opacity associated with Astra-Fil® 90, for each defined product.

EXAMPLE I

A crude Cretaceous kaolin clay was blunged in water to form an aqueous kaolin suspension which was degritted, subjected to magnetic separation and mechanically dispersed via scrub grinding as hereinbefore described. This aqueous kaolin suspension was then optimally dispersed via the addition thereto of sodium hexametaphosphate solution to form a dispersed aqueous kaolin suspension at a solids content of 26% solids by weight. This dispersed aqueous kaolin suspension was then subjected to centrifugation at a solids level of 26% by weight (i.e., without dilution) to define this dispersed aqueous kaolin feed suspension at a defining level of 38.9%, that is 38.9% by dry weight of the kaolin clay in the feed suspension was removed during centrifugation. Centrifugation was carried out in two steps by first passing the feed suspension through an internal recycle disc-nozzle centrifuge to fractionate the feed suspension into an overflow fraction comprising the finer cut and an underflow fraction comprising the coarser cut. The overflow fraction was then again subjected to a centrifugation to fractionate this overflow suspension from the first centrifugation into an overflow suspension comprising the finer cut and an underflow suspension comprising the coarser cut. The overflow suspension from the second centrifugation step, which included 38.9% by weight (dry clay basis) of the clay in the original feed suspension, was discarded. The underflows from the first and second centrifugation steps were collected and combined as the desired defined product. The combined defined underflow suspensions were thence treated with hexamethlyenediamine (HMDA) at a treatment level of 4 pounds HMDA per ton of dry clay, acid flocced to a pH between 2.6 and 2.8 via the addition of sulfuric acid, leached, treated with aluminum sulfate at a treatment level of 14 pounds Alum per ton of dry clay, filtered, rinsed, and slurried to a solids content of about 65% by weight via spray drying and remixing as hereinbefore described to yield a defined kaolin clay filler product. The opacity impvovement exhibited by the filler product of this Example I was determined by the procedure hereinbefore described to be +0.1 points.

EXAMPLE II

A crude Cretaceous kaolin clay was blunged in water to form an aqueous kaolin suspension which was degritted, subjected to magnetic separation and mechanically dispersed via scrub grinding as hereinbefore described. This aqueous kaolin suspension was then optimally dispersed via the addition thereto of sodium hexametaphosphate to form a dispersed aqueous kaolin suspension at a solids content of 25.6% solids by weight. This dispersed aqueous kaolin suspension was then subjected to centrifugation at a solids level of 25.6% by weight (i.e., without dilution) to define this dispersed aqueous kaolin feed suspension at a defining level of 31.8%. Centrifugation was carried out in two steps in the manner illustrated in FIG. 2. That is, the feed suspension was first passed through an internal recycle disc-nozzle centrifuge to fractionate the feed suspension into an overflow fraction comprising the finer cut and an underflow fraction comprising the courser cut. The overflow suspension was then discarded and the underflow suspension was then again subjected to a centrifugation to fractionate this underflow suspension from the first centrifugation into an overflow slurry comprising the finer cut thereto which was discarded and an underflow slurry comprising the courser cut which was collected as the desired defined product. Together, the discarded overflow suspensions from the first and second centrifugation steps included therein 31.8% by weight (dry clay basis) of the clay in the original feed suspension. The defined underflow suspension from the second centrifugation was leached, filtered, rinsed, and slurried via spray drying and remixing as hereinbefore described to yield a defined kaolin clay product. The opacity improvement exhibited by the kaolin clay product was determined by the procedure hereinbefore described to be +1.4 points.

EXAMPLE III

A crude Cretaceous kaolin clay was blunged in water to form an aqueous kaolin suspension which was degritted, subjected to magnetic separation and mechanically dispersed via scrub grinding as hereinbefore described. This aqueous kaolin suspension was then optimally dispersed via the addition thereto of sodium hexametaphosphate to form a dispersed aqueous kaolin suspension at a solids content of 27.2% solids by weight. This dispersed aqueous kaolin suspension was then subjected to centrifugation at a solids level of 27.2% by weight (i.e., without dilution) to define this dispersed aqueous kaolin feed suspension at a defining level of 38.2%. Centrifugation was carried out in a single step in the manner illustrated in FIG. 3 using an internal recycle disc-nozzle centrifuge to fractionate the feed suspension into an overflow fraction comprising the finer cut and an underflow fraction comprising the courser cut. The overflow suspension was then discarded and the underflow suspension was leached, filtered, rinsed, and slurried via spray drying and remixing as hereinbefore described to yield a defined kaolin clay product. The opacity improvement exhibited by the kaolin clay product was determined by the procedure hereinbefore described to be +0.3 points.

EXAMPLE IV

A portion of the defined underflow suspension from the second centrifugation step of Example III was treated with HMDA at a treatment level of 4 pounds HMDA per ton of dry clay, acid flocced to a pH between 2.6 and 2.8 via the addition of sulfuric acid, leached, treated with aluminum sulfate at a treatment level of 14 pounds Alum per ton of dry clay, filtered, rinsed, and slurried to a solids content of about 65% solids by weight via spray drying and remixing as hereinbefore described to yield a defined kaolin clay filler product. The opacity improvement exhibited by the filler product of this Example III was determined by the procedure hereinbefore described to be +1.3 points.

EXAMPLE V

A crude Cretaceous kaolin clay suspension was prepared, defined via two-step centrifugation, and the resultant underflow suspension treated as described in Example II with the exception that the dispersed aqueous kaolin suspension was diluted by the addition of water thereto prior to both centrifugation steps to a solids content of 7.1% by weight in accordance with the present invention. This diluted aqueous kaolin suspension was defined at a defining level of 39.7%. The opacity improvement exhibited by the filler product of this Example IV was determined by the procedure hereinbefore described to be +1.8 points.

EXAMPLE VI

A crude Cretaceous kaolin clay suspension was prepared, defined via two-step centrifugation, and the resultant underflow suspension treated as described in Example II with the exception that the dispersed aqueous kaolin suspension was diluted by the addition of water thereto prior to both centrifugation steps to a solids content of 8.0% by weight in accordance with the present invention. This diluted aqueous kaolin suspension was defined at a defining level of 36.8%. The opacity improvement exhibited by the filler product of this Example IV was determined by the procedure hereinbefore described to be +1.8 points.

EXAMPLE VII

A crude Cretaceous kaolin clay suspension was prepared, defined via two-step centrifugation, and the resultant underflow suspension treated as described in Example VI with the exception that the aqueous kaolin suspension was not mechanically dispersed by scrub grinding prior to centrifugation but rather only chemically dispersed via the addition of sufficient amounts of sodium hexametaphosphate to ensure optimum dispersion as hereinbefore described. This aqueous kaolin suspension was defined at a defining level of 38.0%. The opacity improvement exhibited by the filler product of this Example VI was determined by the procedure hereinbefore described to be +0.7 points.

EXAMPLE VIII

A crude Cretaceous kaolin clay was blunged in water to form an aqueous kaolin suspension which was degritted, subjected to magnetic separation and mechanically dispersed via scrub grinding as hereinbefore described. This aqueous kaolin suspension was then optimally dispersed via the addition thereto of sodium hexametaphosphate to form a dispersed aqueous kaolin suspension at a solids content of 27.2% solids by weight. This dispersed aqueous kaolin suspension was diluted by the addition of water thereto to a solids content of 14.3% by weight in accordance with the present invention and them subjected to centrifugation at a solids level of 14.3% to define this dispersed aqueous kaolin feed suspension at a defining level of 34.0%. Centrifugation was carried out in a single step using an internal recycle type disc-nozzle centrifuge in the manner illustrated in FIG. 3. The overflow suspension from the centrifugation, which comprised the finer cut and included 34% by weight (dry clay basis) of the kaolin content of the feed suspension, was discarded. The underflow suspension comprised the coarser cut and was collected as the desired defined product. This underflow suspension was then treated with hexamethylenediamine and aluminum sulfate and further processed as described in Example IV to yield a defined kaolin clay filler product. The opacity improvement exhibited by the filler product of this Example VIII was determined by the procedure hereinbefore described to be +1.8 points.

The opacity improvements exhibited by each of the defined kaolin clay products of Examples I through VIII are presented hereinbelow in Table I. As is shown therein, the greatest opacity improvements (+1.8 points) were exhibited by those products which were not only produced by defining at low solids level in accordance with the present invention, but were also prepared prior to defining by mechanically dispersing the aqueous kaolin clay via scrub grinding to break up kaolin agglomerates prior to chemically dispersing the suspension to minimum viscosity before defining.

TABLE I

| Sample Name | Feed Solids | Mechanically Dispersed | Defining Level | Treated | Opacity Over AF-90 |
|---|---|---|---|---|---|
| I | 26 | Yes | 38.9 | Yes | 0.1 |
| II | 25.6 | Yes | 31.8 | Yes | 1.4 |
| III | 27.2 | Yes | 38.2 | No | 0.3 |
| IV | 27.2 | Yes | 38.2 | Yes | 1.3 |
| V | 7.1 | Yes | 39.7 | Yes | 1.8 |
| VI | 8.0 | Yes | 36.8 | Yes | 1.8 |
| VII | 8.0 | No | 38.03 | Yes | 0.7 |
| VIII | 14.3 | Yes | 34.0 | Yes | 1.8 |

A comparison of the opacity improvements presented in Table I also confirms that defining by the two-step process of the present invention (Examples IV and V) wherein the underflow suspension, i.e., the coarse cut, from the first centrifugation step is subjected to a second centrifugation step and the overflow suspensions from both centrifugation steps, yields a defined product which exhibits a substantially greater opacity improvement when compared to a product defined at the same defining level but defined by the typical prior art two-step centrifugation exemplified by Example I wherein the overflow suspension, i.e., the finer cut, from the first centrifugation step is subjected to a second centrifugation step and the underflow suspensions from both the first and second centrifugation steps combined to yield the defined product as described in U.S. Pat. No. 2,992,936.

EXAMPLE IX

A crude Cretaceous kaolin clay suspension was prepared as outlined in Example VII and defined via single stage centrifugation using an internal recycle type disc-nozzle centrifuge in the manner illustrated in FIG. III at a feed solids level of 15% by weight and a defining level of 35%. The underflow suspension, comprising the coarser cut, was collected and divided into two portions, one portion of which was then treated with hexamethylenediamine and aluminum sulfate and further processed as described in Example III, while the other portion was not treated with either hexamethylenediamine or aluminum sulfate, but rather merely acid flocced, leached, filtered, rinsed and reslurried.

The treated and untreated products prepared as presented in Example VIII where used in formulate paper coating compositions by admixing 100 parts by weight of the sample product, 12 parts by weight of a latex binder, 6 parts by weight of a starch binder, and 1 part by weight of calcium stearate. For comparison purposes, coating compositions were also prepared via this formulation using a No. 1 coating clay and a No. 1 high brightness kaolin. Each coating formulation was then applied to a 47 lb/3300 ft² basestock paper at a coating weight of 7.1 lb/3300 ft². The coated sheets were then calendered two nips at 140° and 200 psi pressure, before measurements of opacity, brightness, paper gloss and print gloss were taken in accordance with standard TAPPI methods, which measurements are reported in Table II.

TABLE II

| Clay in Coating | Opacity | Brightness | Paper Gloss | Print Gloss |
|---|---|---|---|---|
| No. 1 High Brightness | 87.6 | 79.3 | 59 | 79 |
| No. 1 Coating | 87.7 | 78.2 | 58 | 79 |
| Ex. VIII - Treated | 88.8 | 80.7 | 69 | 88 |
| Ex. VIII - Untreated | 88.7 | 80.6 | 67 | 86 |

A comparison of the opacity, brightness, the paper gloss and print gloss of the paper coatings prepared using the defined kaolin products of Example VIII, both treated and untreated, with those of paper coatings prepared using standard No. 1 coating clay or No. 1 high brightness clay clearly confirms that a defined kaolin clay produced not only by defining at low solids level in accordance with the present invention, but also prepared prior to defining by mechanically dispersing the aqueous kaolin clay via scrub grinding to break up kaolin agglomerates prior to chemically dispersing the suspension to minimum viscosity before defining, will exhibit superior performance as a coating clay with or without subsequent surface treatment.

We claim:

1. A process for preparing a high opacity kaolin product having a relatively narrow particle size distribution and low content of colloidal particles, said process comprising the steps of:
   a. mechanically dispersing a kaolin clay in water to form an aqueous kaolin suspension of substantially unaggregated kaolin particles;
   b. admixing a chemical dispersing agent with said aqueous kaolin suspension produced in step (a), the chemical dispersing agent being added in an amount necessary to ensure the formation of an optimally dispersed and unaggregated aqueous kaolin suspension;
   c. adding dilution water to the optimally dispersed aqueous kaolin suspension in an amount sufficient to reduce the solids content of the optimally dispersed aqueous kaolin suspension to from about 5 to 15% solids by weight;
   d. subjecting the low solids content optimally dispersed aqueous kaolin suspension to a first centrifugation so as to fractionate said aqueous kaolin suspension into an overflow slurry containing a substantial portion of colloidal particle size material therein and a first underflow slurry containing a relatively small portion of colloidal particle size material therein;
   e. rediluting said first underflow slurry with water to from about 5 to 15% solids and subjecting the rediluted slurry to a second centrifugation so as to fractionate said rediluted slurry into an overflow slurry containing a substantial portion of colloidal particle size material therein and a second underflow slurry containing a relatively small portion of colloidal particle size material therein;
   f. controlling the centrifugation steps so that said second underflow slurry of kaolin particles has an average particle surface of less than about 30 square meters per gram as measured by the methylene blue spot test procedure, the low solids content aqueous suspension being subjected to said centrifugation steps being maintained at a temperature of at least about 100° F.; and g. collecting the second underflow slurry from said step (f) as product.

2. A process as recited in claim 1 further comprising maintaining the low solids content aqueous suspension being subjected to centrifugation at a temperature ranging from about 100° F. to about 125° F.

3. A process as recited in claim 1 further comprising controlling the particle content of the overflow slurries to a solids level of less than about 10% solids by weight.

4. A process as recited in claim 3 further comprising controlling the particle content of the overflow slurries to a solids level ranging from about 5% to about 10% solids by weight.

5. A process as recited in claim 1 further comprising treating said underflow slurry from step (g) with a water soluble amine and aluminum sulfate.

6. A process as recited in claim 5 wherein the step of treating said underflow kaolin slurry with a water soluble amine and aluminum sulfate comprises the steps of:

a. admixing hexamethylenediamine into said underflow kaolin slurry;

b. adjusting the pH of said admixture to a level ranging from about 2.6 to about 2.8 by adding an acid thereto;

c. subjecting the kaolin particles in said acidified admixture to a leaching treatment; and d. admixing aluminum sulfate into said acidified admixture.

7. A process as recited in claim 6 wherein hexamethylenediamine is admixed into said underflow kaolin slurry in an amount ranging from about 0.5 to about 2.5 pounds per ton of dry clay.

8. A process as recited in claim 6 wherein aluminum sulfate is admixed into said acidified mixture in an amount ranging from about 10 to about 20 pounds per ton of dry clay.

9. A method in accordance with claim 1 wherein centrifugation steps (d) and (e) are conducted in separate centrifuges.

10. A method in accordance with claim 1, wherein step (d) and (e) are conducted in a single centrifuge to which said rediluted slurry in step (e) is internally recycled.

11. A method in accordance with claim 10, wherein said steps (d) and (e) are carried out in an internal recycle disc-nozzle centrifuge.

* * * * *